June 5, 1945. J. B. WHITE 2,377,736
FRACTIONATION OF HYDROCARBONS
Filed Jan. 23, 1942
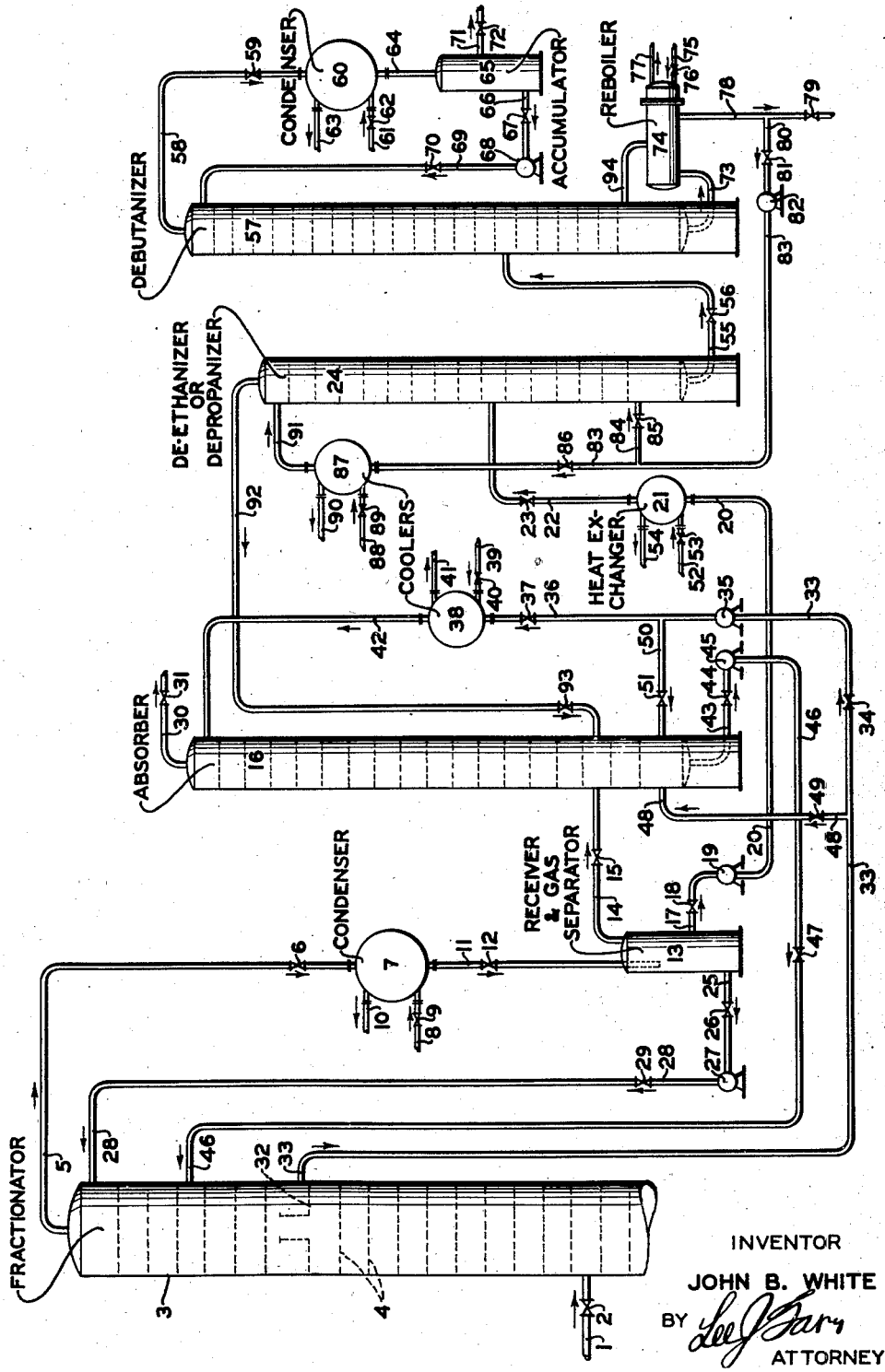
INVENTOR
JOHN B. WHITE
BY Lee J Gary
ATTORNEY Patented June 5, 1945

2,377,736

UNITED STATES PATENT OFFICE 2,377,736

FRACTIONATION OF HYDROCARBONS

John B. White, Chicago, Ill., assignor to Universal Oil Products Company, Chicago, Ill., a corporation of Delaware Application January 23, 1942, Serial No. 427,888

12 Claims. (Cl. 196—94)

This invention relates to an improved method of fractionating hydrocarbons and is particularly applicable to the separation of vapor-gas mixtures, such as those resulting from pyrolytic or catalytic conversion of hydrocarbons, into selected fractions.

With the advent and rapid adoption by the industry of processes for the polymerization of olefins and for their alkylation with paraffins to produce gasoline fractions of high antiknock value, the recovery of heavy, normally gaseous and light liquid fractions of the product formed by cracking hydrocarbon oils has assumed a new and greater importance due to the value of such fractions as charging stock for polymerization and alkylation processes.

Various gas concentrating and separating systems have been devised and used to accomplish substantially complete separation and recovery of the desired fractions from lighter and heavier components of the hydrocarbon mixtures in which they are found. In general, the method of separation commonly employed involves fractional distillation of the mixture with selective absorption of the desired fractions and subsequent liberation thereof from the absorption medium.

The invention is particularly directed to an improvement in this type of system which results in more economical operation. Its features are applicable to and will be found advantageous in a wide variety of fractionating operations. They are illustrated in the accompanying diagrammatic drawing as applied to a system for separately recovering selected relatively light and relatively heavy normally gaseous fractions and substantially gas-free distillate from a mixture of vapors and gases, such as those resulting from the pyrolytic or catalytic cracking or reforming of hydrocarbon oil.

Referring to the drawing, a mixture of hydrocarbon vapors and gases, such as, for example, the vaporous and gaseous products resulting from the thermal or catalytic cracking of hydrocarbon oil or from the thermal or catalytic reforming of the hydrocarbon distillates is supplied, while still in heated state, through line 1 and valve 2 to fractionator 3 wherein its components boiling within the range of the desired light distillate product of the process and the gases are separated from higher boiling components of the mixture. Suitable fractionating means of any well known form, such as bubble trays or the like, indicated by the dotted lines 4, are provided within fractionating column 3 and reflux condensate, comprising the heavy, normally liquid components of the mixture supplied to the fractionator is removed therefrom by well known means, not illustrated, and may be returned for further treatment in the cracking or reforming system, or may be further cracked in a separate system or supplied to cooling and storage or to any desired further treatment.

Fractionated vapors and gases of the desired end-boiling point are removed as the overhead stream from fractionator 3 and directed through line 5 and valve 6 to condenser 7 wherein it passes in indirect contact and heat exchange with a suitable cooling medium, supplied to this zone through line 8 and valve 9 and discharged therefrom through line 10, to condense substantially all of the normally liquid components of the vapors and form a distillate containing substantial quantities of dissolved heavy gases. The resulting gas-containing distillate and remaining uncondensed and undissolved gases are directed from condenser 7 through line 11 and valve 12 to collection and separation in receiver 13.

The uncondensed and undissolved gases are directed from the receiver through line 14 and valve 15 to absorber 16, which will be later described. Gas-containing distillate collected in receiver 13 is directed therefrom through line 17 and valve 18 to pump 19 by means of which it is supplied through line 20, heat exchanger 21, line 22 and valve 23 to the deethanizing or depropanizing column 24, the function of which will be later described.

Regulated quantities of the distillate collected in receiver 13 may be returned via line 25, valve 26, pump 27, line 28 and valve 29 to the upper portion of fractionator 3 to serve as a refluxing and cooling medium in this zone and to control the top temperature of the fractionating column.

The function of absorber 16 is to separate desirable high-boiling components of the gases supplied to this zone from their undesired lower boiling fractions. This is accomplished by countercurrently contacting the gases with a suitable absorber oil in which the desired high-boiling components are selectively absorbed, the lighter unabsorbed fractions being directed from the upper portion of the absorber through line 30 and valve 31 to storage or elsewhere, as desired.

The material utilized as absorber oil in absorber 16 comprises, in the case illustrated, selected intermediate fractions of the reflux condensate formed in fractionator 3. This material is withdrawn from a suitable accumulator tray or hot well 32 disposed at a suitable point intermediate that at which the hot vapor gas mixture is supplied to the fractionator and that from which the fractionated vaporous stream supplied to condenser 7 is withdrawn. The absorber oil preferably corresponds approximately to high-boiling fractions of the distillate collected in receiver 13, although it may also include some higher boiling materials and, due to its relatively high temperature, is substantially free of dissolved gases. It is directed through line 33 and valve 34 to pump 35 by means of which it is supplied through line 36 and valve 37 to cooler 38 wherein its temperature is reduced to a degree which permits its efficient use as absorber oil. Cooling is accomplished by passing the condensate through cooler 38 in indirect contact and heat exchange with a suitable cooling medium supplied thereto through line 39 and valve 40 and removed therefrom through line 41. The cooled condensate is supplied from cooler 38 through line 42 to the upper portion of absorber 16 wherein it passes downwardly in intimate countercurrent contact with the ascending gases and absorbs their desired high-boiling components. Resulting enriched absorber oil collected in the lower portion of absorber 16 is directed therefrom through line 43 and valve 44 to pump 45 by means of which it is returned through line 46 and valve 47 to a point in fractionator 3 above the accumulator tray 32.

The system and its method of operation so far described are conventional and by utilizing a cooled side-stream from fractionator 3 as absorber oil and returning the resulting enriched absorber oil to the fractionator, in the manner described, the concentration of heavy gases in the distillate collected in receiver 13 is increased so that a more selective separation between the desired heavy and undesired light gas fractions is accomplished in the receiver. This is, of course, due to the fact that a selective recovery of heavy normally gaseous fractions is accomplished in absorber 16 and these absorbed gases, returned with the enriched absorber oil to fractionator 3, are revaporized in the latter zone and removed therefrom with the fractionated vaporous stream, thus increasing the concentration of heavy gases therein and in the resulting gas-containing distillate from condenser 7. However, some of the undesired light fractions of the gases will unavoidably be absorbed in absorber 16 and, in conventional practice, are included with the enriched absorber oil returned therefrom to fractionator 3, so that a cycle of this material is built up within the system increasing the required size of the condensing and absorption equipment.

To avoid this recycling of light gases, which it is desired to remove from the upper portion of absorber 16, I provide a novel and advantageous method and means of increasing and controlling the temperature in the lower portion of the absorber to substantially strip the enriched absorber oil of the undesired light gases prior to its return to fractionator 3. This is accomplished by directing regulated quantities of the same hot condensate which is utilized, after cooling, as the absorber oil, into the lower portion of the absorber. Hot condensate may be directed from line 33 through line 48 and valve 49 into the lower portion of the absorber when the liquid head in line 33 is sufficient to permit its introduction into the absorber without the aid of a pump. This will usually be the case since the absorber is preferably operated at a pressure substantially the same or slightly less than that employed in receiver 13 and, due to the friction encountered in condenser 7 and the connecting lines, the receiver and absorber will normally be operated at a sufficiently reduced pressure relative to that employed in fractionator 3 that the liquid head in line 33 will suffice to introduce hot condensate removed from a relatively high point in the fractionator into the lower portion of the absorber. However, in case the liquid head in line 33 is not sufficient, hot condensate may be directed from line 36 on the discharge side of pump 35 through line 50 and valve 51 into the lower portion of the absorber. The hot condensate thus supplied to the absorber directly contacts and supplies sufficient heat to the enriched absorber oil to substantially strip the latter of undesired light gases and, thus, return of light gases to fractionator 3 with the enriched absorber oil is avoided.

Reboiling of the resulting enriched absorber oil to strip it of undesired light gases may, of course, be accomplished in any of several other manners which will be apparent to those familiar with the art. However, the direct introduction of hot condensate from fractionator 3 into the absorber, for this purpose, provides an extremely simple and efficient manner of accomplishing the desired reboiling.

Although, as previously mentioned, the separation of desired relatively heavy and undesired lighter gases in receiver 13 will be made more selective by the use of the features above described, as compared with an operation in which these features are not employed, the distillate collected in receiver 13 will unavoidably contain some dissolved light gases. The function of column 24 is to substantially free the gas-containing distillate from receiver 13 of the undesired low-boiling fractions of the dissolved gases. Column 24 may be operated either as a deethanizer or as a depropanizer, as desired. When the system is operated to recover substantially pure butane and butene fractions for use, for example, as polymerization or alkylation stock or to recover butanes and butenes with heavier, normally liquid fractions, such as pentanes and pentenes, but substantially free of lighter gases, column 24 may be operated as a depropanizer to include substantially all the $C_3$ fractions with the lighter gases liberated therein and removed as the overhead vaporous stream from this zone. In case it is desired to include propane and propene with the recovered butanes and butenes, column 24 is operated as a deethanizer to include substantially all or a regulated portion of the $C_3$ fractions in the reboiled bottoms removed from this zone. In case it is desired to recover substantially pure $C_3$ fractions separate from lighter and heavier fractions, column 24 may either be operated as a depropanizer and the $C_3$ fractions, which will be included in the overhead stream from this zone, supplied therewith to a separate fractionating column, not illustrated, wherein they are separated from the lighter fractions or, preferably, column 24 is operated as a deethanizer in which case the $C_3$ fractions are separated from the reboiled bottoms removed from this zone in a separate depropanizing column, not illustrated, wherefrom the depropanized bottoms are supplied to the debutanizer. Another alternative method of operation which is entirely within the scope of the invention, although not illustrated, is to operate column 24 as a deethanizer, supply the reboiled bottoms from this zone to the debutanizer and separate the C₃ and C₄ fractions liberated from the distillate in the latter zone by supplying the overhead stream therefrom to a separate fractionating column wherefrom the C₃ fractions are removed as the overhead stream and the C₄ fractions as bottoms.

Means, which will be later described, are provided for controlling the top and bottom temperatures in column 24 and conditions of operation may be selected within the skill of one familiar with the art to give the desired separation in this step. The use of heat exchanger 21, here illustrated, is not essential, since all the heat required for accomplishing the desired separation in column 24 may be supplied to the lower portion of this zone, in the manner subsequently described. When heat exchanger 21 is utilized, a suitable heating medium is supplied thereto through line 52 and valve 53, passes through the heat exchanger in indirect contact with the distillate passing from receiver 13 to column 24 and is removed from the heat exchanger through line 54. In any case, however, only a portion of the total heat required in column 24 is supplied thereto by heat exchanger 21.

Distillate, substantially stripped of dissolved light gases (the liberated gases comprising, as previously explained, either propane and lighter fractions or ethane and lighter fractions, and said distillate including substantially all of the C₄ fractions contained in the mixture supplied to fractionator 3) is directed from the lower portion of column 24 through line 55 and valve 56 to debutanizer 57 wherein it is further heated and substantially freed of the dissolved C₄ fractions. The liberated gases are directed from the upper portion of the debutanizer through line 58 and valve 59 to condenser 60, wherein they are substantially condensed by indirect contact and heat exchange with a suitable cooling medium supplied to this zone through line 61 and valve 62 and removed therefrom through line 63. The resulting normally gaseous condensate is directed from condenser 60 through line 64 to accumulator 65 wherefrom regulated quantities thereof are returned via line 66, valve 67, pump 68, line 69 and valve 70 to the upper portion of debutanizer 57 to serve as a cooling and refluxing medium in this zone and to maintain the desired top temperature therein. The remaining portion of the normally gaseous condensate, representing the net make of this material, is directed from receiver 65 through line 71 and valve 72 to storage or directly to the desired further treatment, such as polymerization or alkylation for example.

To supply the required heat to the debutanizer and substantially strip the distillate recovered from this zone of dissolved gases, bottoms from the debutanizer are supplied through line 73 to reboiler 74 wherethrough they pass in indirect contact and heat exchange with a suitable heating medium, such as steam, hot oil or the like, supplied to this zone through line 75 and valve 76 and removed therefrom through line 77. The vapors and/or gases liberated from the distillate in the reboiler are returned therefrom through line 94 to column 57. The hot reboiled and substantially gas-free distillate is removed from the reboiler through line 78 and is directed, in part, through valve 79 in this line to further cooling and storage or to any desired subsequent treatment.

As a special feature of the invention, I utilize regulated quantities of the substantially gas-free distillate recovered from the debutanizing step to control both the top and bottom temperatures in column 24. To control the bottom temperature in the latter zone, furnish at least a portion of the heat required for depropanization or deethanization in this zone of the gas-containing distillate supplied thereto and to insure that the bottoms supplied from column 24 to debutanizer 57 are substantially free of undesired light fractions, regulated quantities of the hot reboiled distillate from reboiler 74 are directed from line 78 through line 80 and valve 81 to pump 82 and supplied therefrom through line 83, line 84 and valve 85 into the lower portion of column 24 to serve as a heating and reboiling medium in this zone. This practice obviates the use of separate reboiling equipment, similar to that employed for the debutanizing step, in the depropanizing or deethanizing step by substituting the simple and effective expedient of introducing hot, reboiled distillate from reboiler 74 into the lower portion of column 24. Thus, this feature (like that previously described, of supplying heat to the lower portion of absorber 16, by introducing hot condensate from fractionator 3 into the lower portion of this zone) eliminates the expense of separate reboiling equipment and accomplishes reboiling, in each case, in a simple and advantageous manner by the use of a short pipe connection and a control valve.

To control the top temperature in column 24, another regulated portion of the reboiled, substantially gas-free distillate from the debutanizing step is directed through valve 86 in line 83 to cooler 87, wherein its temperature is reduced to the desired degree by passing the same through this zone in indirect contact and heat exchange with a suitable cooling medium supplied thereto through line 88 and valve 89 and removed therefrom through line 90. The thus cooled substantially gas-free condensate is directed from cooler 87 through line 91 into the upper portion of column 24 and, in addition to its function of controlling the top temperature in this zone, passes downwardly through the column in intimate countercurrent contact with the ascending vapors and gases to serve as a condensing and absorption medium.

To further insure the substantially complete recovery of C₄ and heavier fractions, as well as C₃ fractions, when desired, separate from the lighter gases, the overhead stream from column 24 is supplied, in the case here illustrated, through line 92 and valve 93 to absorber 16 wherein any desirable heavy fractions escaping absorption and recovery with the bottoms from column 24 are absorbed and returned with the enriched absorber oil from absorber 16 to fractionator 3 to be revaporized and concentrated in the distillate collected in receiver 13.

I claim as my invention:

1. In the process of separating selected fractions from a mixture of fluids of different boiling points in a series of fractionating zones, relatively high-boiling components of the mixture supplied to one of said zones being supplied to another zone of the series and therein further fractionated at higher temperature, the method of reboiling said relatively high-boiling components, to substantially free the same of undesired light fractions, prior to supplying the same to said other fractionating zone, which comprises commingling the same in the lower portion of the first mentioned fractionating zone with a portion of the hotter, higher boiling bottoms product from said other fractionating zone.

2. In the process of separating selected fractions from a mixture of fluids of different boiling points in a series of fractionating zones, relatively high-boiling components of the mixture supplied to one of said zones being separated from lighter components thereof and supplied to another of said fractionating zones wherein they are fractionated at higher temperature to separate undesirable relatively low-boiling components from higher boiling components thereof, the method of supplying heat to and reboiling the first named relatively high-boiling components, to substantially completely separate undesired low-boiling fractions therefrom prior to supplying the same to said other fractionating zone, which comprises commingling therewith in the lower portion of the first mentioned fractionating zone, regulated quantities of the relatively hot, high-boiling bottoms product from said other fractionating zone.

3. In a fractionating system wherein a mixture of vapors and gases is fractionated to condense high-boiling components of the vapors and separate therefrom a fractionated stream of lighter vapors and gases, said stream being subjected to condensation to form a distillate containing dissolved heavy gases, the resulting gas-containing distillate separated from remaining uncondensed and undissolved gases, the latter supplied to an absorption zone and therein contacted with relatively cool absorption liquid, to recover in the latter selected high-boiling components of the gases and separate the same from lower boiling components thereof, the improved method of operation which comprises, removing from said fractionating step relatively hot, substantially gas-free fractions of condensate formed therein, commingling regulated quantities thereof while still in heated state with the enriched absorption liquid formed in said absorption step to reboil and substantially free the latter of undesired light gases, and cooling and supplying another regulated quantity of said condensate fractions to the absorption step for use therein as said absorption liquid.

4. In a fractionating system wherein a mixture of vapors and gases is fractionated to condense high-boiling components of the vapors and separate therefrom a fractionated stream of lighter vapors and gases, said stream being subjected to condensation to form a distillate containing dissolved heavy gases, the resulting gas-containing distillate separated from remaining uncondensed and undissolved gases, the latter supplied to an absorption zone and therein contacted with relatively cool absorption liquid, to recover in the latter selected high-boiling components of the gases and separate the same from lower boiling components thereof, the improved method of operation which comprises, removing from said fractionating step relatively hot, substantially gas-free fractions of said condensate formed therein, cooling and supplying a regulated quantity of said condensate fractions to the absorption step for use therein as said absorption liquid, passing another regulated quantity thereof while still in heated state in heat exchange relation with the enriched absorption liquid in said absorption step to reboil and substantially free the same of undesired light gases, and returning resulting reboiled enriched absorption liquid to said fractionation.

5. In a fractionating system wherein a mixture of vapors and gases is fractionated to condense high-boiling components of the vapors and separate therefrom a fractionated stream of lighter vapors and gases, said stream being subjected to condensation to form a distillate containing dissolved heavy gases, the resulting gas-containing distillate separated from remaining uncondensed and undissolved gases, the latter supplied to an absorption zone and therein contacted with relatively cool absorption liquid, to recover in the latter selected high-boiling components of the gases and separate the same from lower boiling components thereof, the improved method of operation which comprises, removing from said fractionating step relatively hot, substantially gas-free fractions of said condensate formed therein, commingling regulated quantities thereof while still in heated state with the enriched absorption liquid in said absorption step to reboil and substantially free the same of undesired light gases, and cooling and supplying another regulated quantity of said condensate fractions to the absorption step for use therein as said absorption liquid.

6. In a fractionating system wherein a mixture of vapors and gases is fractionated to condense high-boiling components of the vapors and separate therefrom a fractionated stream of lighter vapors and gases, said stream being subjected to condensation to form a distillate containing dissolved heavy gases, the resulting gas-containing distillate separated from remaining uncondensed and undissolved gases, the latter supplied to an absorption zone and therein contacted with relatively cool absorption liquid, to recover in the latter selected high-boiling components of the gases and separate the same from lower boiling components thereof, the improved method of operation which comprises, removing from said fractionating step relatively hot, substantially gas-free fractions of said condensate formed therein, cooling and supplying a regulated quantity of said condensate fractions to the absorption step for use therein as said absorption liquid, commingling another regulated quantity thereof while still in heated state into contact with the enriched absorption liquid in said absorption step to reboil and substantially free the same of undesirable light gases, and returning resulting reboiled enriched absorption liquid to said fractionation.

7. In a fractionating system wherein a mixture of normally liquid and normally gaseous fluids is fractionated in contact with an absorption liquid to form an intermediate product, said intermediate product comprising substantially all of said normally liquid fractions, said absorption liquid and selected relatively heavy components of said normally gaseous fractions being further fractionated, at higher temperature, in a zone separate from the first named fractionating step whereby to liberate normally gaseous fractions therefrom, leaving a relatively hot product to be removed as bottoms from said separate fractionating step, the improved method of operation which comprises, reboiling said intermediate product, to substantially free the same of undesired relatively light gases prior to supplying the same to the second mentioned fractionating step, by contacting therewith in the first mentioned fractionating step, regulated quantities of said relatively hot bottoms product.

8. In a fractionating system wherein a mixture of normally liquid and normally gaseous fluids is fractionated in contact with an absorption liquid to form an intermediate product, said intermediate product comprising substantially all of said normally liquid fractions, said absorption liquid and selected relatively heavy components of said normally gaseous fractions being further fractionated, at higher temperature, in a zone separate from the first named fractionating step whereby to liberate normally gaseous fractions therefrom, leaving a relatively hot product to be removed as bottoms from said separate fractionating step, the improved method of operation which comprises, reboiling said intermediate product, to substantially free the same of undesired relatively light gases prior to supplying the same to the second mentioned fractionating step, by commingling therewith in the first mentioned fractionating step regulated quantities of said relatively hot bottoms product.

9. In a fractionating system wherein a mixture of normally liquid and normally gaseous fluids is fractionated in contact with an absorption liquid to form an intermediate product, said intermediate product comprising substantially all of said normally liquid fractions, said absorption liquid and selected relatively heavy components of said normally gaseous fractions being further fractionated, at higher temperature, in a zone separate from the first named fractionating step whereby to substantially free the same of dissolved normally gaseous fractions, leaving a relatively hot substantially gas-free bottoms product, the improved method of operation which comprises, reboiling said intermediate product, to substantially free the same of undesired relatively light gases prior to supplying the same to the second mentioned fractionating step, by commingling therewith in the first mentioned fractionating step regulated quantities of said relatively hot, substantially gas-free product, and cooling and returning another regulated quantity of said substantially gas-free product to the absorption step for use therein as said absorption liquid.

10. In a fractionating system wherein a mixture of vapors and gases is fractionated to form a hot condensate comprising high-boiling components of the vapors and separate therefrom a fractionated stream of lighter vapors and gases, said stream subjected to condensation to form a distillate containing dissolved heavy gases, resulting gas-containing distillate separated from remaining uncondensed and undissolved gases, the latter further fractionated in contact with absorption liquid comprising cooled selected fractions of said condensate formed in the first mentioned fractionating step, to separate from said gases and recover in the absorption liquid selected high-boiling components of the gases, resulting enriched absorption liquid containing said heavy gases returned from the absorption step to the first mentioned fractionating step wherein dissolved gases are liberated therefrom and commingled with said fractionated stream, said gas-containing distillate supplied to a third fractionating step and therein substantially freed of undesired, light components of the dissolved gases, resulting distillate containing desirable heavy gas fractions supplied from said third fractionating step to a fourth fractionating step and therein substantially freed of the remaining heavy gas fractions, leaving a relatively hot, substantially gas-free distillate product, the improved method of operation which comprises, cooling and returning regulated quantities of said substantially gas-free distillate product to said third fractionating step to serve therein as a refluxing, cooling and absorption medium and to control the temperature and composition of the stream of light gases removed therefrom, commingling another regulated portion of said substantially gas-free distillate, while still in heated state, with the gas-containing distillate to be supplied from the third to the fourth fractionating step, whereby to substantially free the same of undesired light gas fractions prior to its introduction into the latter zone, and commingling a regulated quantity of said selected condensate fractions from the first mentioned fractionating step, while still in heated state, with said enriched absorption liquid in the second mentioned fractionating step, to reboil and substantially free the latter of undesired light gas fractions prior to its return to the first mentioned fractionating step.

11. In a fractionating system wherein a mixture of vapors and gases is fractionated to form a hot condensate comprising high-boiling components of the vapors and separate therefrom a fractionated stream of lighter vapors and gases, said stream subjected to condensation to form a distillate containing dissolved heavy gases, resulting gas-containing distillate separated from remaining uncondensed and undissolved gases, the latter further fractionated in contact with absorption liquid comprising cooled selected fractions of said condensate formed in the first mentioned fractionating step, to separate from said gases and recover in the absorption liquid selected high-boiling components of the gases, resulting enriched absorption liquid containing said heavy gases returned from the absorption step to the first mentioned fractionating step wherein dissolved gases are liberated therefrom and commingled with said fractionated stream, said gas-containing distillate supplied to a third fractionating step and therein substantially freed of undesired light components of the dissolved gases, resulting distillate containing desirable heavy gas fractions supplied from said third fractionating step to a fourth fractionating step and therein substantially freed of the remaining heavy gas fractions, leaving a relatively hot, substantially gas-free distillate product, the improved method of operation which comprises, cooling and returning regulated quantities of said substantially gas-free distillate product to said third fractionating step to serve therein as a refluxing, cooling and absorption medium and to control the temperature and composition of the stream of light gases removed therefrom, returning said stream of light gases to the second mentioned fractionating and absorption step to recover therefrom any desirable heavy fractions, commingling another regulated portion of said substantially gas-free distillate, while still in heated state, with the gas-containing distillate to be supplied from the third to the fourth fractionating step, whereby to substantially free the same of undesired light gas fractions prior to its introduction into the latter zone, and commingling a regulated quantity of said selected condensate fractions formed in the first mentioned fractionating step, while still in heated state, with said enriched absorption liquid in the second mentioned fractionating step to reboil and substantially free the latter of undesired light gas fractions prior to its return to the first mentioned fractionating step.

12. A process for separating selected fractions from a mixture of fluids of different boiling points, which comprises fractionating said mixture in a first fractionating zone to separate lighter from heavier components thereof, removing the lighter components as vapor from the upper portion of said zone, removing the heavier components as liquid from the lower portion of said zone, further fractionating the withdrawn heavier components in a second fractionating zone at a higher temperature to separate therefrom an intermediate boiling fraction of said mixture, introducing a portion of the bottoms product from said second zone, while still hot, into the lower portion of said first zone to reboil the liquid therein, cooling another portion of said bottoms product and introducing the same to the upper portion of said first zone to descend in countercurrent contact with the vapors in the last-named zone.

JOHN B. WHITE.